(12) United States Patent
You et al.

(10) Patent No.: US 11,310,689 B2
(45) Date of Patent: Apr. 19, 2022

(54) METHOD FOR DYNAMICALLY INDICATING QFI AND USER EQUIPMENT

(71) Applicant: GUANGDONG OPPO MOBILE TELECOMMUNICATIONS CORP., LTD., Guangdong (CN)

(72) Inventors: Xin You, Dongguan (CN); Cong Shi, Dongguan (CN); Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 491 days.

(21) Appl. No.: 16/336,786

(22) PCT Filed: Feb. 8, 2018

(86) PCT No.: PCT/CN2018/075870
§ 371 (c)(1),
(2) Date: Mar. 26, 2019

(87) PCT Pub. No.: WO2019/153207
PCT Pub. Date: Aug. 15, 2019

(65) Prior Publication Data
US 2021/0368381 A1 Nov. 25, 2021

(51) Int. Cl.
*H04W 28/02* (2009.01)
*H04W 80/02* (2009.01)

(52) U.S. Cl.
CPC ........ *H04W 28/0268* (2013.01); *H04W 80/02* (2013.01)

(58) Field of Classification Search
CPC . H04W 28/02; H04W 28/0268; H04W 80/00; H04W 80/02; H04W 28/00; H04W 28/16; H04W 52/265
See application file for complete search history.

(56) References Cited

U.S. PATENT DOCUMENTS

2020/0021530 A1* 1/2020 Jiang .................... H04L 47/2441
2020/0374948 A1* 11/2020 Pan ........................ H04W 76/00

FOREIGN PATENT DOCUMENTS

| CN | 107439037 A | 12/2017 |
|----|-------------|---------|
| CN | 107493590 A | 12/2017 |
| KR | 20180006236 A | 1/2018 |

OTHER PUBLICATIONS

CMCC. "R2-1710393, 3GPP TSG-RAN WG2 Meeting #99 bis, Prague, Czech Republic, Oct. 9-13, 2017", Shorter QFI in SDAP Header, Oct. 13, 2017 (Oct. 13, 2017), pp. 1-4, and figure 1 (Year: 2017).*

(Continued)

*Primary Examiner* — Jinsong Hu
*Assistant Examiner* — Farideh Madani
(74) *Attorney, Agent, or Firm* — Ladas & Parry LLP

(57) ABSTRACT

The disclosure relates to the field of wireless communications and provides a method for dynamically indicating a Quality of Service (QoS) Flow Identity (ID) (QFI) and User Equipment (UE). The method includes: a UE obtains a Service Data Adaptation Protocol (SDAP) Service Data Unit (SDU) and obtains a first QFI to which the SDAP SDU belongs; maps the first QFI with a relatively large number of bits to a second QFI with a relatively small number of bits, here, a value of the first QFI is mapped to a value of the second QFI which is the same as the value of the first QFI when a value of the first QFI is less than a first preset threshold and the value of the first QFI is mapped to a value of an unmapped vacant position of the second QFI when the value of the first QFI is greater than the first preset threshold; and then includes the second QFI in an SDAP header. Thus, communication service may be implemented better on the basis of an existing communication standard.

18 Claims, 2 Drawing Sheets

(56) References Cited

OTHER PUBLICATIONS

Notice of Allowance of the Chinese application No. 201880003858.X, dated Feb. 3, 2020.
Mediatek Inc: "Some considerations on SDAP header design", 3GPP Draft: R2-1801151 Some Considerations on SDAPHEADER. 3rd Generation Partnership Project (3GPP). Mobile Competence Centre; 650, Route Des Lucioles; F-06921 Sophia-Antipolis Cedex: France, vol. RAN WG2, No. Vancouver, Canada; Jan. 22, 2018-Jan. 26, 2018 Jan. 12, 2018 (Jan. 12, 2018), XP051386616 [retrieved on Jan. 12, 2018].
First Office Action of the European application No. 18857430.5, dated Apr. 21, 2020.
First Office Action of the Chinese application No. 201880003868.X, dated Dec. 3, 2019.
Supplementary European Search Repor in the European application No. 18857430.5, dated Aug. 21, 2019.
Ericsson: "SDAP QFI mapping between AS and NAS", 3GPP Draft; R2-1803157—SDAP QFI Mapping Between AS and NAS, 3rd Generation Partnership Project (3GPP), Mobile Competence Centre; 650, Route Des Lucioles ; F-06921 Sophia-Antipolis Cedex; France, vol. RAN WG2, No. Athens, Greece; Feb. 26, 2018-Mar. 2, 2018 Feb. 15, 2018 (Feb. 15, 2018), XP051399931, Retrieved from the Internet: URL:http://www.3gpp.org/ftp/tsg%5Fran/WG2%5FRL2/TSGR2%5F101/Docs/.
Mediatek Inc: "QFI mapping in SDAP", 3GPP Draft; R2-1803410 QFI Mapping in SDAP, 3rd Generation Partnership Project (3GPP), Mobile Competence Centre ; 650, Route Des Lucioles; F-06921 Sophia-Antipolis Cedex; France, vol. RAN WG2 , No. Athens, Greece; Feb. 26, 2018-Mar. 2, 2018 Feb. 16, 2018 (Feb. 16, 2018), XP051400505, Retrieved from the Internet: URL:http://www.3gpp.org/ftp/tsg%5Fran/WG2%5FRL2/TSGR2%5F101/Docs/.
Intel Corporation: "QFI in SDAP header", 3GPP Draft; R2-1800940_SDAP, 3rd Generation Partnership Project (3GPP), Mobile Competence Centre ; 650, Route Des Lucioles; F-06921 Sophia-Antipolis Cedex; France, vol. RAN WG2 , No. Vancouver, Canada; Jan. 22, 2018-Jan. 26, 2018 Jan. 12, 2018 (Jan. 12, 2018), XP051386459, Retrieved from the Internet: URL:http//www.3gpp.org/ftp/tsg%5Fran/WG2%5FRL2/TSGR2%5FAHs/2018%5F01%5FNR/Docs/.
Qualcomm Incorporated: "ON mapping NAS QFI to AS QFI", 3GPP Draft; R2-1803403 ON Mapping NAS QFI To AS QFI, 3rd Generation Partnership Project (3GPP), Mobile Competence Centre ; 650, Route Des Lucioles ; F-06921 Sophia-Antipolis Cedex ; France, vol. RAN WG2, No. Athens, Greece Feb. 26, 2018-Mar. 2, 2018 Feb. 16, 2018 (Feb. 16, 2018), XP051400499, Retrieved from the Internet: URL:http://www.3gpp.org/ftp/tsg%5FranNG2%5FRL2/TSGR2%5F101/Docs/.
International Search Report in the international application No. PCT/CN2018/075870, dated Oct. 25, 2018.
Written Opinion of the International Search Authority in the International application No. PCT/CN2018/075870, dated Oct. 25, 2018.
International Search Report in international application No. PCT/CN2018/075870, dated Oct. 25, 2018.
Written Opinion of the Interational Search Authority in international application No. PCT/CN2018/075870, dated Oct. 25, 2018.
CMCC R2-1710393, 3GPP TSG-RAN WG2 Meeting #99 bis, Prague, Czech Republic, Oct. 9-13, 2017 Shorter QFI in SDAP header (Oct. 13, 2017).
OPPO R2-1707779, 3GPP TSG-RAN2 #99, Berlin, Germany, Aug. 21-25, 2017 Discussion on QFI awareness (Aug. 25, 2017).
3rd Generation Partnership Project; Technical Specification Group Services and System Aspects; Service requirements for the 5G system; Stage 1 (Release 16); 3GPP TS 22.261 V16.6.0 (Dec. 2018).

* cited by examiner

METHOD FOR DYNAMICALLY INDICATING QFI AND USER EQUIPMENT

RELATED APPLICATION

This application is an application under 35 U.S.C. 371 of International Application No. PCT/CN2018/075870 filed on Feb. 8, 2018, the entire contents of which are incorporated herein by reference.

TECHNICAL FIELD

The disclosure relates to the field of wireless communications, and particularly to technologies for dynamically indicating a Quality of Service (QoS) Flow Identity (ID) (QFI).

BACKGROUND

5th-Generation (5G) refers to a 5G mobile phone operation and communication standard and is also called a 5G mobile communication technology. 5G is an extension of 4th-Generation (4G) and is under research. A theoretical Down Link/(DL) speed of a 5G network is 10 Gb/s. It is expected in the industry that 5G has broad development prospect.

Under a 5G architecture, a New Radio (NR) protocol stack is divided into two planes including a User Plane (UP) and a Control Plane (CP). A UP protocol stack refers to a protocol cluster for user data transmission, and a CP protocol stack refers to a protocol cluster for system control signaling transmission.

Compared with a Long Term Evolution (LTE) protocol stack, an NR UP is added with a Service Data Adaptation Protocol (SDAP) layer, and a UP protocol sequentially includes from top to bottom: the SDAP layer, a Packet Data Convergence Protocol (PDCP) layer, a Radio Link Control (RLC) layer, a Medium Access Control (MAC) layer and a Physical (PHY) layer. The SDAP layer is mainly configured for a mapping between a Quality of Service (QoS) flow and a radio bearer and configured to mark a QFI in DL and Up Link (UL) packets.

However, a latest conference progress of the 3rd Generation Partnership Project (3GPP) concludes that a QFI carried in an SDAP header and a QFI carried in an N3 interface have different numbers of bits, which causes mismatch, thus a communication service cannot be implemented.

From the above, it is urgent in the art to propose a method capable of implementing communication service better on the basis of an existing communication standard.

SUMMARY

A purpose of the disclosure is to provide a method for dynamically indicating a QFI and User Equipment (UE), which may implement a communication service better on the basis of an existing communication standard.

In a first aspect of the disclosure, a method for dynamically indicating a QFI is provided, which may include the following operations.

A UE obtains an SDAP Service Data Unit (SDU), and obtains a first QFI to which the SDAP SDU belongs.

The UE maps the first QFI to a second QFI, and includes the second QFI in an SDAP header.

Here, a number of bits of the first QFI may be greater than a number of bits of the second QFI.

In a preferred embodiment, the method may further include the following sub-operations.

When a value of the first QFI is less than a first preset threshold, the UE maps the value of the first QFI to a value of the second QFI which is the same as the value of the first QFI.

When the value of the first QFI is greater than the first preset threshold, the UE maps the value of the first QFI to a value of an unmapped vacant position of the second QFI.

In a second aspect of the disclosure, a UE is provided, which may include an acquisition module, a mapping module and a setting module.

The acquisition module may be configured to obtain an SDAP SDU and obtain a first QFI to which the SDAP SDU belongs.

The mapping module may be configured to map the first QFI to a second QFI.

The setting module may be configured to include the second QFI in an SDAP header.

Here, a number of bits of the first QFI may be greater than a number of bits of the second QFI.

In a preferred embodiment, the mapping module may further include the following submodules.

A first mapping submodule, which may be configured to, when a value of the first QFI is less than a first preset threshold, map the value of the first QFI to a value of the second QFI which is the same as the value of the first QFI.

A second mapping submodule, which may be configured to, when the value of the first QFI is greater than the first preset threshold, map the value of the first QFI to a value of an unmapped vacant position of the second QFI.

In a third aspect of the disclosure, a computer storage medium is provided. The computer storage medium has stored thereon computer-executable instructions, that when executed by a processor, cause the processor to perform the steps of any abovementioned method.

Embodiments of the disclosure have at least the following effects.

For the problem of mismatch caused by the fact that in an existing communication standard, the number of bits of a second QFI carried in an SDAP header of a Radio Access Network (RAN) side has been agreed to be determined to be 6 but the number of bits of a first QFI obtained by the UE is 7, the inventor of the disclosure utilizes the characteristic that values in the first QFI are not arranged in order, namely the number of bits of the first QFI may be reduced if the first QFI is determined to be arranged according to a requirement, thus a novel method for dynamically indicating a QFI is proposed so as to map the first QFI to the second QFI with a smaller number of bits and include the second QFI in the SDAP header. Therefore, the problem of the mismatch caused by magnitudes of the number of bits is solved, and the communication service may be implemented better on the basis of the existing communication standard.

Furthermore, in the specific method for dynamically indicating the QFI, the first QFI with the relatively large number of bits is divided into two sections through a threshold; the first section directly corresponds to the second QFI with the relatively small number of bits, that is, a value of the first QFI is mapped to a value of the second QFI which is the same as the value of the first QFI; and the second section is mapped to the unmapped vacant position of the second QFI. Therefore, the QFI with the relatively large number of bits is mapped to the QFI with the relatively small number of bits better, and the communication service is implemented better.

It is to be understood that in the scope of the disclosure, each abovementioned technical feature and each technical feature specifically described below (for example, in embodiments) in the embodiments of the disclosure may be combined, thereby forming new or preferred technical solutions. Due to space limitations, the technical solutions will not be elaborated herein one by one.

Figure 1:
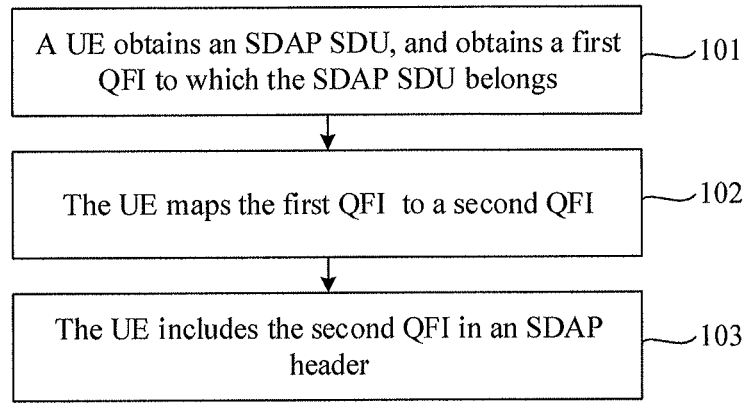
FIG. 1 is a flowchart of a method for dynamically indicating a QFI according to an embodiment of the disclosure.

In each drawing,
201: Acquisition module
202: Mapping module
203: Setting module

DETAILED DESCRIPTION

Part of terms involved in the disclosure will be described below.
QFI: Quality of Service (QoS) Flow Identity (ID)
SDAP: Service Data Adaptation Protocol
SDAP SDU: Service Data Adaptation Protocol Service Data Unit
RLC: Radio Link Control
MAC: Medium Access Control
PHY: Physical Layer
5QI: 5G Quality of Service Identifier
NR: New Radio
PDU: Protocol Data Unit
PDU session: Protocol Data Unit session
QoS flow: Quality of Service flow
NAS: Non-Access Stratum
GBR: Guaranteed Bit Rate
Non-GBR: Non-Guaranteed Bit Rate
DL: Down Link
UL: Up Link
RB: Resource Bearer between a terminal and a base station
DRB: Data Resource Bearer between the terminal and the base station
RAN: Radio Access Network
PDCP: Packet Data Convergence Protocol The inventor of the disclosure finds by extensive and deep researches that the problem of mismatch caused by the fact that the number of bits of a first QFI obtained by UE is different from the number of bits of a second QFI carried in an SDAP header of an RAN side is required to be solved to implement communication service better on the basis of an existing communication standard. Meanwhile, the inventor of the disclosure finds that although the number of bits of the first QFI is 7, the first QFI is not arranged in order, and thus proposes division of the first QFI into two parts, a value of one part which is less than or equal to 6 bits (i.e., 0-63) is directly mapped to a value of the second QFI which is the same as the value of one part less than or equal to 6 bits and a value of the other part which is greater than 6 bits (i.e., 64-79) is mapped to a value of an unmapped vacant position of the second QFI. In such a novel method for dynamically indicating the QFI, the first QFI is mapped to the second QFI with a smaller number of bits and the second QFI is included in the SDAP header, so that the problem of mismatch caused by magnitudes of the number of bits is solved, and the communication service may further be implemented better on the basis of the existing communication standard.

The embodiments of the disclosure have at least the following advantages.

1) Mappings between QFIs with different numbers of bits are implemented, and the problem of mismatch caused by the fact that the number of bits of the first QFI obtained by the UE is different from the number of bits of the second QFI carried in the SDAP header of the RAN side is solved.

2) The communication service may be implemented better on the basis of the existing communication standard.

From the above, the method for dynamically indicating the QFI and the UE provided in the embodiments of the disclosure implement better communication service and thus have broad application prospect in the field of 5G communication.

In order to make the purpose, technical solutions and advantages of the disclosure clearer, the embodiments of the disclosure will further be described below in combination with the drawings in detail. In the following descriptions, many technical details are proposed to make a reader understand the disclosure better. However, those of ordinary skill in the art should know that the technical solutions claimed in each claim of the disclosure may also be implemented even without these technical details and various variations and modifications made on the basis of each of the following embodiments.

First embodiment: a method for dynamically indicating a QFI

A specific implementation scenario of the embodiment of the disclosure will be introduced at first.

Figure 3:
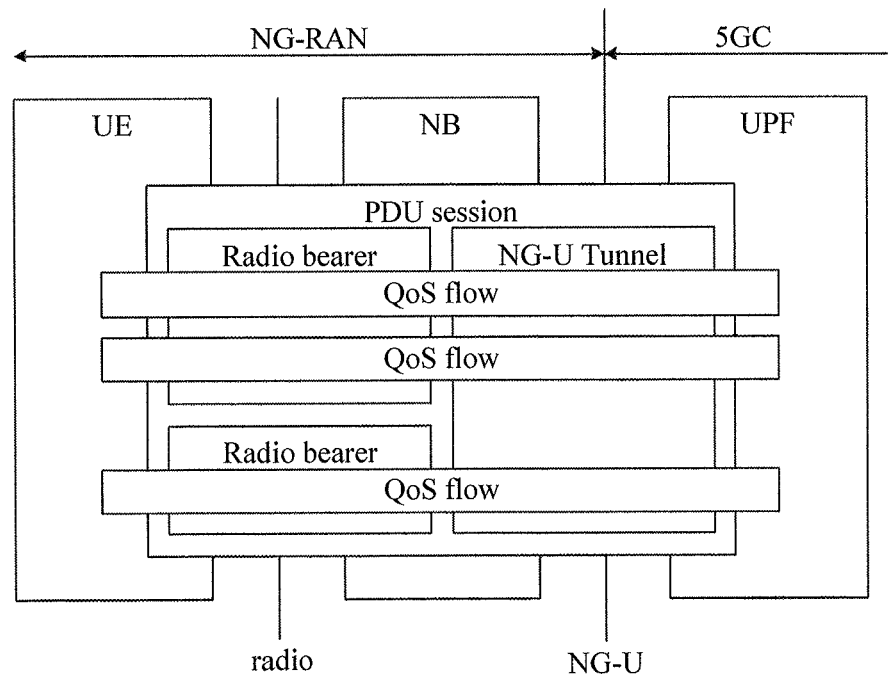
FIG. 3 is an architecture diagram of a QoS in an application scenario according to an embodiment of the disclosure.
Figure 4:
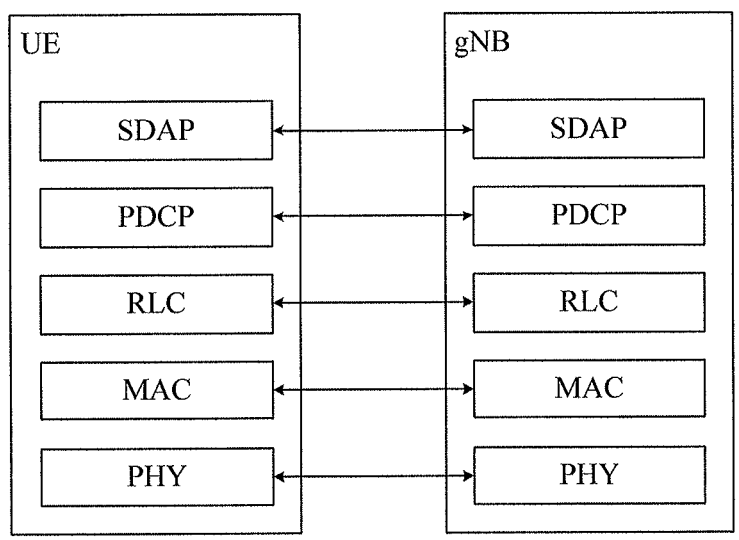
FIG. 4 is a schematic diagram of a UP protocol stack in an application scenario according to an embodiment of the disclosure.

FIG. 3 is an architecture diagram of a QoS in an application scenario according to an embodiment of the disclosure. FIG. 4 is a schematic diagram of a UP protocol stack in an application scenario according to an embodiment of the disclosure. In combination with FIG. 3 and FIG. 4, for each UE, 5GC creates one or more PDU sessions, and each PDU session may correspond to one or more DRBs, which is configured to bear data of the PDU session, at an air interface.

More specifically, a minimum granularity of QoS in a PDU session may be distinguished as different QoS flows, a PDU session may have multiple QoS flows and different QoS flows are marked with different QFIs. In a PDU session, the same QoS processing, for example, scheduling, may be performed on data in the same QoS flow.

A QFI may mark each packet in an N3 interface from 5GC to a RAN, and the number of bits of the QFI is 7. A QFI is unique in a PDU session. The QFI in the N3 interface may be dynamically allocated and may also be implicitly equal to a 5QI.

TABLE 1

| Value of 5QI | Resource type | Priority | Packet delay estimation | Packet error rate | Default maximum data burst (NOTE 2) | Default average window | Example service |
|---|---|---|---|---|---|---|---|
| B | Delay key GBR | 11 | 5 ms | $10^{-5}$ | 160 B | TBD | Remote control (see TS 22.261 [2]) |
| C NOTE 4 | | 12 | 10 ms NOTE 5 | $10^{-6}$ | 320 B | TBD | Intelligent transport systems |
| D | | 13 | 20 ms | $10^{-5}$ | 640 B | TBD | |
| 1 | GBR NOTE 1 | 20 | 100 ms | $10^{-2}$ | N/A | TBD | Conversational Voice |
| 2 | | 40 | 150 ms | $10^{-3}$ | N/A | TBD | Conversational Video (Live Streaming) |
| 3 | | 30 | 50 ms | $10^{-3}$ | N/A | TBD | Real Time Gaming, V2X messages Electricity distribution-medium voltage, Process automation monitoring |
| 4 | | 50 | 300 ms | $10^{-6}$ | N/A | TBD | Non-Conversational Video (Buffered Streaming) |
| 65 | | 7 | 75 ms | $10^{-2}$ | N/A | TBD | Mission Critical user plane Push To Talk voice (e.g., MCPTT) |
| 66 | | 20 | 100 ms | $10^{-2}$ | N/A | TBD | Non-Mission-Critical user plane Push To Talk voice |
| 75 | | 25 | 50 ms | $10^{-2}$ | N/A | TBD | V2X messages |
| E NOTE 4 | | 18 | 10 ms | $10^{-4}$ | 255 B | TBD | Discrete Automation |
| F NOTE 4 | | 19 | 10 ms | $10^{-4}$ | 1358 B NOTE 3 | TBD | Discrete Automation |
| 5 | Non-GBR NOTE 1 | 10 | 100 ms | $10^{-6}$ | | N/A | IMS Signaling |
| 6 | | 60 | 300 ms | $10^{-6}$ | | N/A | Video (BufferedStreaming) TCP-based (e.g., www, e-mail, chat, ftp, p2p fde sharing, progressive video, etc.) |
| 7 | | 70 | 100 ms | $10^{-3}$ | | N/A | Voice, Video (Live Streaming), Interactive Gaming |
| 8 | | 80 | 300 ms | $10^{-6}$ | | N/A | Video (Buffered Streaming) TCP-based (e.g., www, e-mail, chat, ftp, p2p file) sharing, progressive video, etc. |
| 9 | | 90 | | | | N/A | |
| 69 | | 5 | 60 ms | $10^{-6}$ | | N/A | Mission Critical delay sensitive signalling (e.g., MC-PTT signalling) |
| 70 | | 55 | 200 ms | $10^{-6}$ | | N/A | Mission Critical Data (e.g. example services are the same as QCI 6/8/9) |
| 79 | | 65 | 50 ms | $10^{-2}$ | N/A | N/A | V2X messages |
| G | | 66 | 10 ms | $10^{-6}$ | N/A | N/A eMBB applications Augmented Reality | Low Latency |

NOTE 1:
a packet which is delayed more than PDB is not counted as lost, thus not included in the PER.
NOTE 2:
it is required that default Maximum Data Burst Volume is supported by a PLMN supporting the related 5QIs.
NOTE 3:
This Maximum Burst Size value is intended to avoid IP fragmentation on an IPv6 based, IPSec protected, GTP tunnel to the 5G-AN node.
NOTE 4:
A delay of 1 ms for the delay between a PCEF and a 5G-AN should be subtracted from a given PDB to derive the packet delay budget that applies to the radio interface.
NOTE 5:
The jitter for this service is assumed to be 20. msec as per TS 22.261 [2].

Table 1 illustrates one-to-one mappings between 5QIs and 5G QoS characteristics. Since a maximum value of the 5QI is 79, the QFI is required to be at least 7 bits.

Moreover, on a RAN side, an SDAP layer may mark a QFI for each SDAP PDU (if configured) to mark a mapping relationship between a QoS flow and a DRB. For DL, the QFI is marked by the RAN side (SDAP layer) and is transmitted at an air interface for purpose of Reflective QoS. If neither an NR-RAN nor a NAS uses a reflective mapping, the QFI may not be required to be transmitted at the air interface during the DL. For UL, an NG-RAN may make such a configuration that UE transmits a QFI at an air interface.

It is to be noted that although the maximum value of the 5QI is 79 and the QFI is required to be at least 7 bit, a QFI carried in an SDAP header of a RAN side has been agreed to be 6 bits, thus the problem of mismatch caused by the fact that the QFI in the N3 interface is 7 bits but the QFI of the RAN side is 6 bits is required to be solved, otherwise communication service cannot be implemented.

A specific method of the embodiment of the disclosure will further be described below.

Referring to FIG. 1, a method for dynamically indicating a QFI of the embodiment includes the following operations.

In 101, UE obtains an SDAP SDU, and obtains a first QFI to which the SDAP SDU belongs. The SDAP SDU is from an upper layer of a protocol stack of the UE. Specifically, for UL, the SDAP SDU is from an application layer; and for DL, the SDAP SDU is from a core network. Those skilled in the art should know that on the basis of the principle of the disclosure, QFI mapping of the embodiment of the disclosure may be applied to both of UL and DL. Furthermore, in the embodiment of the disclosure, a value of the first QFI is equal to a value of a 5QI.

In 102, the UE maps the first QFI to a second QFI, herein, the number of bits of the first QFI is greater than the number of bits of the second QFI. Furthermore, in the embodiment of the disclosure, the first QFI has 7 bits and the second QFI has 6 bits.

More specifically, the embodiment may be understood to correspond to a condition mentioned above, that is, a QFI carried in an SDAP header is the second QFI and has 6 bits, namely maximally supporting 64 QoS flows. The first QFI is dynamically indicated to the 5QI or equal to the 5QI. Since the 5QI presently supports 0-97, as described above, a size of the first QFI is 7 bits.

The inventor of the disclosure finds by researches that the 5QI is not arranged in order. Under such a condition, if the 5QI is arranged in order or properly mapped, the second QFI with 6 bits may also work. Therefore, the inventor of the disclosure maps the first QFI with 7 bits to the second QFI with 6 bits, so that the first QFI with 7 bits which is obtained by the UE from the SDAP SDU may match with the second QFI carried in the SDAP header by the mapping, thus the communication service is implemented.

Furthermore, in 102, the mapping is performed through the following specific conditions.

When a value of the first QFI is less than a first preset threshold, the value of the first QFI is mapped to a value of the second QFI which is the same as the value of the first QFI. When the value of the first QFI is greater than the first preset threshold, the value of the first QFI is mapped to a value of an unmapped vacant position of the second QFI. For example, if the value of the first QFI is less than the first preset threshold, the value of the first QFI is directly mapped to a value of the second QFI which is the same as the value of the first QFI. Under such a condition, the value of the second QFI is considered to be "mapped" value, and another value of the second QFI, i.e., a value having yet not formed a corresponding relationship with a value of the first QFI, is considered to be the "unmapped vacant position": As described above, when the value of the first QFI is greater than the first preset threshold, the value of the first QFI is mapped to a value of the "unmapped vacant position" of the second QFI. For convenient understanding, two examples (referring to Table 2 and Table 3) of mapping the first QFI to the second QFI will specifically be listed below.

Furthermore, in the embodiment of the disclosure, a function of the first preset threshold is to divide the first QFI with 7 bits into two parts (0-63, 64-79), i.e., a QFI having a value less than or equal to 6 bits and a QFI having a value greater than 6 bits.

Under this condition, "63" or "64" may be determined as the first preset threshold. Those skilled in the art should know that when "63" is determined as the first preset threshold and when the value of the first QFI is equal to the first preset threshold "63", the value of the first QFI is mapped to a value of the second QFI which is the same as the value of the first QFI. When "64" is determined as the first preset threshold and the value of the first QFI is equal to the first preset threshold "64", the value of the first QFI is mapped to a value of the unmapped vacant position of the second QFI.

In other words, it can also be understood that the first preset threshold is 6 bits, i.e., 64 values. Under this condition, the first preset threshold includes 64 values including 0-63. For the 64 values, the values of the first QFI are mapped to the values of the second QFI which are the same as the values of the first QFI, and for other values greater than 6 bits, the other values of the first QFI are mapped to values of unmapped vacant positions of the second QFI.

Furthermore, in the embodiment of the disclosure, the vacant position is detected by the UE. Or in another embodiment of the disclosure, the vacant position is indicated by Radio Resource Control (RRC) signaling.

In 103, the UE includes (or sets) the second QFI in the SDAP header. Those skilled in the art should know that the QFI with 7 bits is mapped to the QFI with 6 bits through mapping between the first QFI and the second QFI, and the number of bits of the second QFI is the same as the size of a QFI specified in the SDAP header and is 6 bits, so that the problem of mismatch is solved, and the communication service may be implemented better on the basis of a present communication protocol.

Furthermore, in the embodiment of the disclosure, after 103, the method further includes the following operations. An SDAP layer of the UE stores mapping relationships between the first QFI and the second QFI, herein, the mapping relationships are determined as a basis for mapping of a value of a first QFI, to which an SDAP SDU received by the UE in the future belongs, to a corresponding value of the second QFI. Under this condition, the UE, when receiving the first QFI to which the SDAP SDU belongs, may determine mapping between the first QFI and the second QFI according to or with reference to the existing mapping relationships, so that advantages of high processing speed, system resource saving and the like are achieved.

Furthermore, on such a basis, after 103, the method further includes the following operations. When the first QFI has existed in existing mapping relationships, the first QFI is mapped to the second QFI according to the mapping relationships. When the first QFI does not exist in the existing mapping relationships and the value of the first QFI is less than the first preset threshold, the value of the first QFI is mapped to a value of the second QFI which is the same as the value of the first value, and the mapping relationship is stored. When the first QFI does not exist in the existing mapping relationships and the value of the first QI is greater than the first preset threshold, the value of the first QFI is mapped to a value of the unmapped vacant position of the second QFI and the mapping relationship is stored. Those skilled in the art should understand that a mapped QFI value may be remapped to make a value, which is less than 6 bits, of the first QFI directly correspond to a value of the second QFI. However, a value, which is less than 6 bits, of a first QFI which is subsequently received may also be directly mapped to a value of a vacant position of the second QFI.

Two examples of mapping the first QFI to the second QFI will specifically be listed below.

| GBR | | | | | | | |
|---|---|---|---|---|---|---|---|
| First QFI (5QI) | 1 | 2 | 3 | 4 | 65 | 66 | 75 |
| Second QFI | 1 | 2 | 3 | 4 | 10 | 11 | 12 |

As illustrated in Table 2, in a GBR service, when the UE receives from an upper layer the first QFI to which the SDAP SDU belongs, the UE divides the first QFI with 7 bits into two parts (0-63, 64-79) according to the first preset threshold. For 0-63, i.e., the first QFI of which a value is less than the first preset threshold, e.g., "1,2,3,4", the UE maps "1,2,3,4" to the same values "1,2,3,4" of the second QFI. For the first QFI of which a value is greater than the first preset threshold, e.g., "65,66,75", the UE maps "65,66,75" to values of unmapped vacant positions "10,11,12" of the second QFI. Therefore, mapping from the first QFI to the second QFI is implemented. Then, the UE includes the second QFI in the SDAP header.

TABLE 3

| Non-GBR | | | | | | | |
|---|---|---|---|---|---|---|---|
| First QFI (5QI) | 5 | 6 | 7 | 8 | 9 | 69 | 70 | 79 |
| Second QFI | 5 | 6 | 7 | 8 | 9 | 13 | 14 | 15 |

As illustrated in Table 3, in a Non-GBR service, when the UE receives from an upper layer the first QFI to which the SDAP SDU belongs, the UE divides the first QFI with 7 bits two parts (0-63, 64-79) according to the first preset threshold. For 0-63, i.e., the first QFI of which a value is less than the first preset threshold value, e.g., "5,6,7,8,9", the UE maps "5,6,7,8,9" to the same values "5,6,7,8,9" of the second QFI. For the first QFI of which a value is greater than the first preset threshold, e.g., "69,70,79", the UE maps "69,70,79" to values of unmapped vacant positions "13,14, 15" of the second QFI. Therefore, mapping from the first QFI to the second QFI is implemented. Then, the UE includes the second QFI in the SDAP header.

The embodiment of the disclosure has at least the following advantages.

By use of the characteristic that the 5QI with 7 bits, i.e., the first QFI, is not arranged in order and new mapping conditions, a value, which is less than or equal to 6 bits, of the first QFI is mapped to the same value of the second QFI with 6 bits, and a value, which is greater than 6 bits, of the first QFI is mapped to a value corresponding to the unmapped vacant position of the second QFI, so that mapping of the 5QI with a relatively large number of bits to the second QFI with a relatively small number of bits for matching is implemented. The mapped QFI is included in the SDAP header, so that better communication service may be provided on the basis of the existing communication standard.

Second Embodiment: UE

Figure 2:
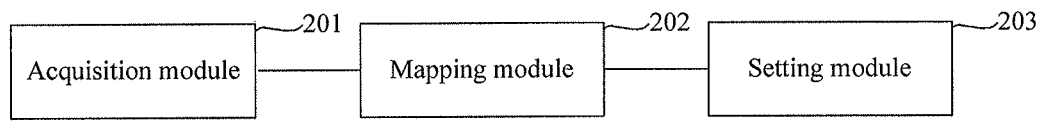
FIG. 2 is a structure diagram of a UE according to an embodiment of the disclosure.

Referring to FIG. 2, the UE of the embodiment includes an acquisition module 201, a mapping module 202 and a setting module 203. Herein, the acquisition module 201 is configured to obtain an SDAP SDU and a first QFI to which the SDAP SDU belongs. The mapping module 202 is configured to map the first QFI to a second QFI. The setting module 203 is configured to include the second QFI in an SDAP header. Herein, a number of bits of the first QFI is greater than a number of bits of the second QFI.

Furthermore, in the embodiment of the disclosure, the mapping module 202 further includes the following sub-modules.

A first mapping submodule which is configured to, when a value of the first QFI is less than a first preset threshold, map the value of the first QFI to a value of the second QFI which is the same as the value of the first QFI.

A second mapping submodule which is configured to, when the value of the first QFI is greater than the first preset threshold, map the value of the first QFI to a value of an unmapped vacant position of the second QFI.

Furthermore, in the embodiment of the disclosure, the UE further includes a storage module, configured to store mapping relationships between the first QFI and the second QFI in an SDAP layer of the UE, here, the mapping relationships are determined as a basis for mapping of a value of a first QFI, to which an SDAP SDU received by the UE in the future belongs, to a corresponding value of the second QFI.

Furthermore, in the embodiment of the disclosure, the value of the first QFI is equal to a value of a 5QI.

Furthermore, in the embodiment of the disclosure, the first QFI has 7 bits and the second QFI has 6 bits.

Furthermore, in the embodiment of the disclosure, the mapping module 202 further includes a third mapping submodule, configured to, when the value of the first QFI is equal to the first preset threshold and the first threshold is 63, map the value of the first QFI to the value of the second QFI which is the same as the value of the first QFI. Furthermore, in the embodiment of the disclosure, the mapping module 202 further includes a fourth mapping submodule, configured to, when the value of the first QFI is equal to the first preset threshold and the first threshold value is 64, map the value of the first QFI to the value of the unmapped vacant position of the second QFI.

Furthermore, in the embodiment of the disclosure, the vacant position is detected by the UE.

Furthermore, in the embodiment of the disclosure, the vacant position is indicated by RRC signaling.

Furthermore, in the embodiment of the disclosure, the mapping module 202 further includes the following submodules.

A fifth mapping submodule which is configured to, when the first QFI has existed in existing mapping relationships, map the first QFI to the second QFI according to the mapping relationships.

A sixth mapping submodule which is configured to, when the first QFI does not exist in the existing mapping relationships and the value of the first QFI is less than the first preset threshold, map a value of the first QFI to a value of the second QFI which is the same as the value of the first QFI. Moreover, the storage module is further configured to store the mapping relationship.

A seventh mapping submodule which is configured to, when the first QFI does not exist in the existing mapping relationships and the value of the first QFI is greater than the first preset threshold, map the value of the first QFI to a value of an unmapped vacant position of the second QFI. Moreover, the storage module is further configured to store the mapping relationship.

The embodiment is a device embodiment corresponding to the above method embodiment and the embodiment may be implemented in combination with the above embodiment. Related technical details mentioned in the above embodiment are still effective in the embodiments and, for reducing repetitions, will not be elaborated herein. Correspondingly, related technical details mentioned in the embodiment may also be applied to the above embodiment.

The embodiment at least has the following advantages.

By use of the characteristic that the 5QI with 7 bits, i.e., the first QFI, is not arranged in order and through new mapping conditions, a value, which is less than or equal to 6 bits, of the first QFI is mapped to the same value of the second QFI with 6 bits, and a value, which is greater than 6 bits, of the first QFI is mapped to a value of the unmapped vacant position of the second QFI, so that mapping of the 5QI with a relatively large number of bits to the second QFI with a relatively small number of bits for matching is implemented. The mapped QFI is included in the SDAP header, so that better communication service may be provided on the basis of the existing communication standard.

It is to be noted that each module mentioned in each device embodiment of the disclosure is a logical module. Physically, a logical module may be a physical module, may also be a part of a physical module and may further be implemented by a combination of multiple physical modules. Physical implementation modes of these logical modules are not the most important, but a combination of functions realized by these logical modules is the key for solving the technical problem to be solved in the disclosure. In addition, for highlighting innovative parts of the disclosure, modules related not so closely to the technical problem to be solved in the disclosure are not introduced in each device embodiment of the disclosure, but it does not mean that no more other modules exist in the device embodiment.

It is to be noted that those skilled in the art should know that the functions realized by each module in the UE may be understood with reference to related descriptions in the method for dynamically indicating the QFI. The functions of each module in the UE may be realized through a program running on a processor, and may also be realized through a specific logical circuit. When being implemented in form of software functional module and sold or used as an independent product, the UE of the embodiments of the disclosure may also be stored in a computer-readable storage medium. Based on such an understanding, the technical solutions of the embodiments of the disclosure substantially or parts making contributions to the conventional art may be embodied in form of software product, and the computer software product is stored in a storage medium, including a plurality of instructions configured to enable a computer device (which may be a personal computer, a server, a network device or the like) to execute all or part of the method in each embodiment of the disclosure. The storage medium includes: various media capable of storing program codes such as a U disk, a mobile hard disk, a Read-Only Memory (ROM), a magnetic disk or an optical disk. As a consequence, the embodiments of the disclosure are not limited to any specific hardware and software combination.

Correspondingly, the embodiments of the disclosure also provide a computer storage medium having stored thereon computer-executable instructions that, when executed by a processor, cause the processor to perform the method for dynamically indicating the QFI of the embodiments of the disclosure.

It is to be noted that in the disclosure, a relationship term such as first and second is adopted only to distinguish an entity or operation from another entity or operation and does not always require or imply existence of any practical relationship or sequence between these entities or operations. Moreover, terms "include" and "contain" or any other variant thereof is intended to cover nonexclusive inclusions, so that a process, method, object or device including a series of elements not only includes those elements but also includes other elements which are not clearly listed or further includes elements intrinsic to the process, the method, the object or the device. Under the condition of no more limitations, an element defined by the statement "including a/an" does not exclude existence of the same other elements in a process, method, object or device including the element. In the disclosure, execution of an operation according to a certain element refers to execution of the operation at least according to the element, and has two conditions including execution of the operation only according to the element and execution of the operation according to the element and another element. Expressions such as multiple, multiple times and various include two, twice, two kinds, more than two, more than twice and more than two kinds.

All documents mentioned in the disclosure are cited as references in the disclosure, just like each document is independently cited as a reference. In addition, it is to be understood that those skilled in the art, after reading the contents of the disclosure, may make various variations or modifications to the disclosure and these equivalent forms shall also fall within the scope claimed by the disclosure.

The invention claimed is:

1. A method for dynamically indicating a Quality of Service (QoS) Flow Identity (ID) (QFI) comprising:
   obtaining, by User Equipment (UE), a Service Data Adaptation Protocol (SDAP) Service Data Unit (SDU) and obtaining a first QFI to which the SDAP SDU belongs; and
   mapping, by the UE, the first QFI to a second QFI, comprising:
      when a value of the first QFI is less than a first threshold, mapping the value of the first QFI to a value of the second QFI which is the same as the value of the first QFI;
      when the value of the first QFI is greater than the first threshold, mapping the value of the first QFI to a value of an unmapped vacant position of the second QFI; and
      when the value of the first QFI is equal to the first threshold, mapping the value of the first QFI to the value of the second QFI which is the same as the value of the first QFI, or mapping the value of the first QFI to the value of the unmapped vacant position of the second QFI; and
   comprising the second QFI in an SDAP header,
   wherein a number of bits of the first QFI is greater than a number of bits of the second QFI.

2. The method of claim 1, further comprising: after mapping the first QFI to the second QFI,
   storing, by the UE, mapping relationships between the first QFI and the second QFI.

3. The method of claim 2, wherein the UE stores the mapping relationships through an SDAP layer.

4. The method of claim 2, wherein mapping the first QFI to the second QFI comprises:
   when the first QFI has existed in stored mapping relationships, mapping the first QFI to the second QFI according to the mapping relationships;
   when the first QFI does not exist in the stored mapping relationships and a value of the first QFI is less than a first preset threshold, mapping the value of the first QFI to a value of the second QFI which is the same as the value of the first QFI to form a mapping relationship and storing the mapping relationship; and when the first QFI does not exist in the stored mapping relationships and the value of the first QFI is greater than the first preset threshold, mapping the value of the first QFI to a value of an unmapped vacant position of the second QFI in the mapping relationships to form a mapping relationship and storing the mapping relationship.

5. The method of claim 1, wherein a value of the first QFI is equal to a value of a 5th-Generation QoS Identifier (5QI).

6. The method of claim 1, wherein the first QFI has 7 bits and the second QFI has 6 bits.

7. The method of claim 1, wherein mapping the value of the first QFI to the value of the second QFI which is the same as the value of the first QFI or mapping the value of the first QFI to the value of the unmapped vacant position of the second QFI, when the value of the first QFI is equal to the first threshold comprises:

when the first threshold is 63 and the value of the first QFI is equal to the first threshold, mapping the value of the first QFI to the value of the second QFI which is the same as the value of the first QFI; and when the first threshold is 64 and the value of the first QFI is equal to the first threshold, mapping the value of the first QFI to the value of the unmapped vacant position of the second QFI.

8. The method of claim 1, wherein
the vacant position is detected by the UE; or
the vacant position is indicated by Radio Resource Control (RRC) signaling.

9. User Equipment (UE), comprising:
a processor; and
a memory storing instructions, when executed by the processor, cause the processor to obtain a Service Data Adaptation Protocol (SDAP) Service Data Unit (SDU) and a first Quality of Service (QoS) Flow Identity (ID) (QFI) to which the SDAP SDU belongs;
map the first QFI to a second QFI; and
comprise the second QFI in an SDAP header,
wherein a number of bits of the first QFI is greater than a number of bits of the second QFI;
wherein the processor is further configured to:
when a value of the first QFI is less than a first preset threshold, map the value of the first QFI to a value of the second QFI which is the same as the value of the first QFI;
when the value of the first QFI is greater than the first preset threshold, map the value of the first QFI to a value of an unmapped vacant position of the second QFI; and
when the value of the first QFI is equal to the first preset threshold, map the value of the first QFI to the value of the second QFI which is the same as the value of the first QFI, or map the value of the first QFI to the value of the unmapped vacant position of the second QFI.

10. The UE of claim 9, wherein the processor is configured to store mapping relationships between the first QFI and the second QFI.

11. The UE of claim 10, wherein the processor is configured to store the mapping relationships through an SDAP layer.

12. The UE of claim 10, wherein the processor is configured to:
when the first QFI has existed in existing mapping relationships, map the first QFI to the second QFI according to the mapping relationships;

when the first QFI does not exist in the existing mapping relationships and a value of the first QFI is less than the first preset threshold, map the value of the first QFI to a value of the second QFI which is the same as the value of the first QFI to form a mapping relationship; and store the mapping relationship; and when the first QFI does not exist in the existing mapping relationships and the value of the first QFI is greater than the first preset threshold, map the value of the first QFI to a value of an unmapped vacant position of the second QFI to form a mapping relationship; and store the mapping relationship.

13. The UE of claim 9, wherein a value of the first QFI is equal to a value of a 5th-Generation QoS Identifier (5QI).

14. The UE of claim 9, wherein the first QFI has 7 bits, and the second QFI has 6 bits.

15. The UE of claim 9, wherein the processor is further configured to:
when the value of the first QFI is equal to the first preset threshold and the first preset threshold is 63, map the value of the first QFI to the value of the second QFI which is the same as the value of the first QFI; or
when the value of the first QFI is equal to the first preset threshold and the first preset threshold is 64, map the value of the first QFI to the value of the unmapped vacant position of the second QFI.

16. The UE of claim 9, wherein the vacant position is detected by the UE; or
the vacant position is indicated by Radio Resource Control (RRC) signaling.

17. A non-transitory computer storage medium having stored thereon computer-executable instructions that, when executed by a processor, cause the processor to perform a method of for dynamically indicating a Quality of Service (QoS) Flow Identity (ID) (QFI), wherein the method comprises:
obtaining, by User Equipment (UE), a Service Data Adaptation Protocol (SDAP) Service Data Unit (SDU) and obtaining a first QFI to which the SDAP SDU belongs; and
mapping, by the UE, the first QFI to a second QFI, comprising:
when a value of the first QFI is less than a first threshold, mapping the value of the first QFI to a value of the second QFI which is the same as the value of the first QFI;
when the value of the first QFI is greater than the first threshold, mapping the value of the first QFI to a value of an unmapped vacant position of the second QFI; and
when the value of the first QFI is equal to the first threshold, mapping the value of the first QFI to the value of the second QFI which is the same as the value of the first QFI, or mapping the value of the first QFI to the value of the unmapped vacant position of the second QFI; and
comprising the second QFI in an SDAP header,
wherein a number of bits of the first QFI is greater than a number of bits of the second QFI.

18. The non-transitory computer storage medium of claim 17, wherein the instructions further cause the processor to, after mapping the first QFI to the second QFI, store mapping relationships between the first QFI and the second QFI.

* * * * *